Feb. 22, 1927.
S. H. ROGERS
1,618,606
TIRE CHAIN CONSTRUCTION
Filed Aug. 6, 1924
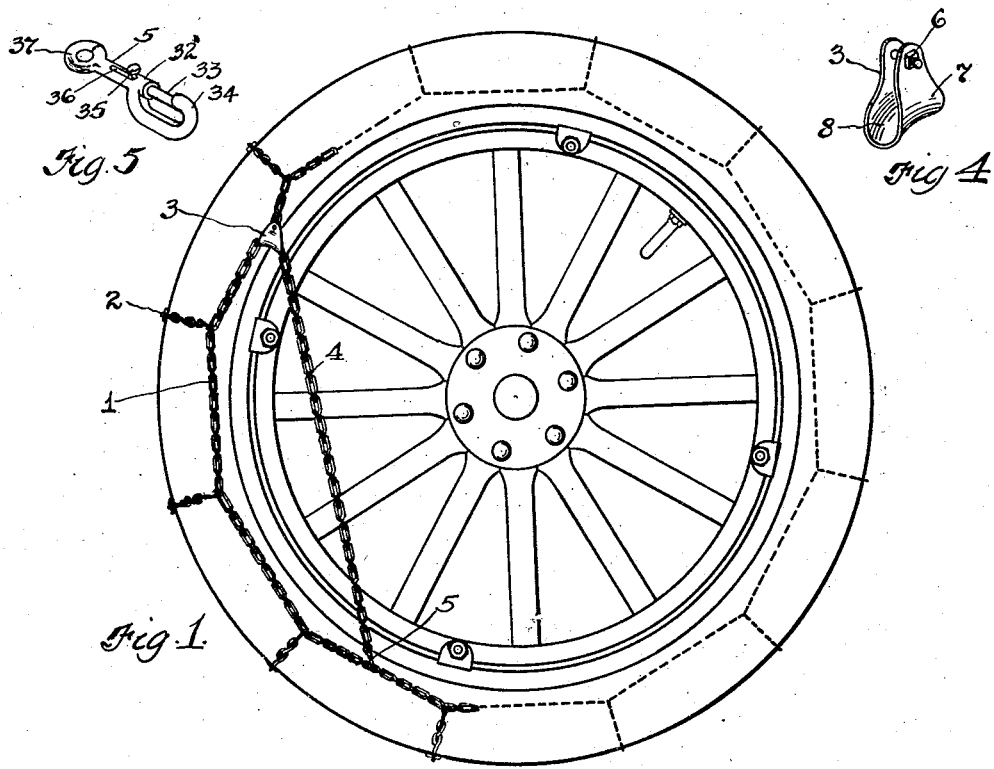
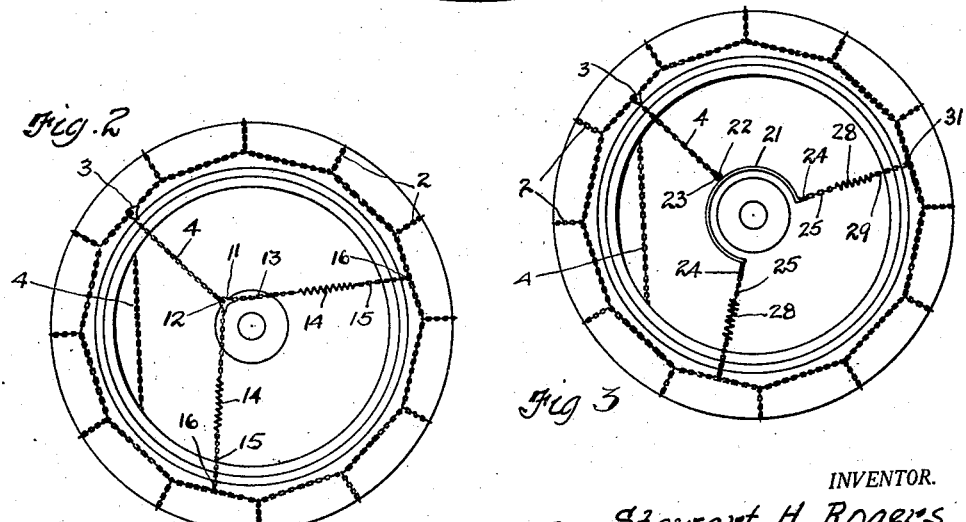
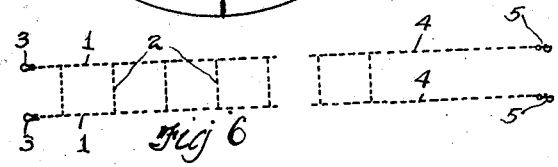
INVENTOR.
Stewart H. Rogers
BY
Fay, Oberlin & Fay
ATTORNEYS Patented Feb. 22, 1927.

1,618,606

UNITED STATES PATENT OFFICE.

STEWART H. ROGERS, OF CLEVELAND, OHIO.

TIRE-CHAIN CONSTRUCTION.

Application filed August 6, 1924. Serial No. 730,406.

This invention relates to tire chain construction. More particularly it comprises improved means whereby a tire chain for anti-skid purposes may be applied to the tire of an automobile wheel with less effort than is required with the present types of such devices and at the same time provide a more efficient securing means. It also contemplates the combination with the improved tire fastening device of means for equalizing the tension upon the side chains of the tire and serving to more satisfactorily maintain the chains in operative relation with the wheel. To the accomplishment of the foregoing and related ends, said invention, then, consists of the means hereinafter fully described and particularly pointed out in the claims.

The annexed drawing and the following description set forth in detail certain structures embodying the invention, such disclosed means constituting, however, but one of various structural forms in which the principle of the invention may be used.

In said annexed drawing:—

Fig. 1 is a side elevation showing an automobile wheel having a side chain equipped with the improved form of fastening device; Fig. 2 is a similar view of an automobile wheel showing an anti-skid chain equipped with the improved form of fastening device and also with an equalizer; Fig. 3 is a view, similar to Fig. 2, showing a modified form of equalizer; Fig. 4 is an enlarged detail view in perspective showing one of the running connectors forming a part of the construction; Fig. 5 is an enlarged detail view in perspective showing the harness-hook type of snap hook employed to connect the free end of the running chain with the side chain of the construction; and Fig. 6 is a diagrammatic view showing the improved form of chain of the type shown in Fig. 1 in extended position.

As clearly shown in the drawing, the device comprises the usual pair of side chains 1 having a series of cross chains 2 secured at their ends to opposite links of said respective side chains at spaced intervals. At adjacent extremities of the side chains, running connectors 3 are secured, the said connectors providing for the running engagement therewith of the extended ends 4 of the opposite extremities of said side chains. At the ends of said extended ends, snap hooks 5, preferably of the harness-hook type, are provided. As is clearly shown in Fig. 1, the extended ends of the side chains are drawn across a segment of the wheel and have the snap hooks engage with links of the side chain at a point fairly remote from the position of the running connectors.

As clearly shown in Fig. 4, the running connectors are preferably formed of sheet metal plates bent into U shape and having aligned apertures in their free ends through which a securing bolt 6 is placed. The base 7 of the U-shaped plate is preferably of somewhat increased length and is concave on its under side. The lower portion of the U-shaped loop may be of somewhat enlarged diameter so as to provide free running engagement for the links of the extension ends of the chain as they slide back and forth through the convex trackway 8 thus provided. This trackway while permitting the free movement of the chain to adjusted position provides a certain degree of frictional engagement which prevents the too rapid shifting of the links and the consequent wearing of the parts.

While extension ends of the type illustrated in Fig. 1 may be used upon each of the side chains, it has been found that by providing such extension ends only upon the inner of the side chains and supplying the outer side chain with a pair of short equalizing chains, that all of the advantages obtained through the use of independent equalizers may be secured, while the necessary resistance to the centrifugal action of the wheel will be supplied by the non-resilient connection upon the inner side chain. Two forms of equalizing devices are shown in the drawing. In the form shown in Fig. 2, a second running connection 11 is secured to the end loop of the extension end 4 by means of the bolt 12 and an equalizing chain 13 is secured in running engagement with said connector. Adjacent the ends of the equalizing chain a pair of coiled springs 14 are secured. At the free ends of the springs a pair of short chains 15 are provided, bearing the usual harness-hooks 16 for securing the same to the adjacent links of the side chain. In this form of construction the rearward side chain is of the type described in connection with Fig. 1, the extension end 4 thereof providing a non-resilient connection with one of the links of the side chain at a point fairly remote from the position of the running connector.

In the form of device shown in Fig. 3, a yoke 21 is secured at an intermediate point to the end of the extension end 4 by means of an eye 22 and bolt 23. The ends of the yoke are preferably extended to points adjacent the lower half of the wheel, to which the chain is applied, and are formed with hooks 24 which are adapted to engage short chain sections 25 having springs 26 attached to their outer ends. The free ends of the springs are provided with short chain extensions 29 provided at their outer ends with the usual snap hooks 31.

The snap hooks employed in the construction are preferably of the conventional harness-hook type shown in Fig. 5, wherein the body of the hook 32 is of hollow cylindrical form to receive a spring pressed latch 33, the lower end of which abuts against the hook end 34. The latch may be retracted by means of a button 35 projecting through a slot 36. An eye 37, at the upper end of the hook, provides means for fastening the same to the extension end of the side chain.

The length of the extension ends is such that complete detachment of the same from the running connectors is unnecessary inasmuch as the side chains may be extended sufficiently to pass over the circumference of the tire when such chains are opened to their fullest extent. When the chains are applied to the wheel, the side chains may be drawn to a very tight degree of adjustment by reason of the fact that a very firm hold may be secured upon the extension ends. When the equalizing device is not used, a certain degree of equalizing action will be obtained by virtue of the fact that the extension ends cross a considerable segment of the wheel between the running connectors and their point of attachment to the side chains.

Other forms may be employed embodying the features of my invention instead of the one here explained, change being made in the form or construction, provided the elements stated by any of the following claims or the equivalent of such stated elements be employed.

I therefore particularly point out and distinctly claim as my invention:

1. A tire chain construction comprising a pair of side chains, a series of cross chains secured at their ends to opposite points of the respective side chains at spaced intervals, a pair of running connectors secured to adjacent free ends of said side chains, non-resilient extension ends on the opposite free ends of said side chains, each of a length sufficient to permit free running engagement with said connectors, and means for securing the free ends of said extension chains to said side chains at points remote from said running connectors, said means on one side of said chain construction extending from a point adjacent the hub to two spaced circumferential points.

2. A tire chain construction comprising a pair of side chains, a series of cross chains secured at their ends to opposite points of the respective side chains at spaced intervals, means for securing the inner side chain in adjustment upon said tire, a running connector secured to the free end of said outer side chain, a non-resilient extension end on the opposite free end of said outer side chain, of a length to permit free running engagement with said connector, and means for securing the free end of said extension chain to its adjacent side chain at points remote from said running connector and extending from a point adjacent the hub to two spaced circumferential points.

Signed by me, this 31st day of July, 1924.

STEWART H. ROGERS.